US012544990B2

(12) United States Patent
Corvaglia et al.

(10) Patent No.: US 12,544,990 B2
(45) Date of Patent: Feb. 10, 2026

(54) PROCESS FOR MANUFACTURING A STRUCTURAL COMPONENT IN COMPOSITE MATERIAL STIFFENED WITH AT LEAST ONE STRINGER

(71) Applicant: LEONARDO S.P.A., Rome (IT)

(72) Inventors: Stefano Giuseppe Corvaglia, Grottaglie (IT); Pasquale Gambardella, Grottaglie (IT)

(73) Assignee: LEONARDO S.P.A. (IT)

( * ) Notice: Subject to any disclaimer, the term of this patent is extended or adjusted under 35 U.S.C. 154(b) by 122 days.

(21) Appl. No.: 18/017,705

(22) PCT Filed: Jul. 27, 2021

(86) PCT No.: PCT/IB2021/056811
§ 371 (c)(1),
(2) Date: Jan. 24, 2023

(87) PCT Pub. No.: WO2022/023974
PCT Pub. Date: Feb. 3, 2022

(65) Prior Publication Data
US 2023/0264434 A1 Aug. 24, 2023

(30) Foreign Application Priority Data
Jul. 27, 2020 (IT) .................. 102020000018136

(51) Int. Cl.
*B64C 1/06* (2006.01)
*B29C 70/30* (2006.01)
(Continued)

(52) U.S. Cl.
CPC .......... *B29C 70/302* (2021.05); *B29C 70/545* (2013.01); *B29C 70/887* (2013.01);
(Continued)

(58) Field of Classification Search
CPC ...................................... B64C 1/064
See application file for complete search history.

(56) References Cited

U.S. PATENT DOCUMENTS 8,276,846 B2 10/2012 Lloyd
9,623,620 B2 4/2017 Brizon et al.
(Continued)

FOREIGN PATENT DOCUMENTS

EP 2886311 A1 6/2015
EP 3028845 A1 6/2016
EP 3549755 A1 10/2019

*Primary Examiner* — Scott W Dodds
(74) *Attorney, Agent, or Firm* — The Belles Group, P.C.

(57) ABSTRACT

A process for manufacturing a structural component made of composite material comprising a skin and at least one stiffening stringer applied rigidly and integrally to one face of the skin. The process comprises a) arranging, on a tool, a plurality of first layers of uncured or pre-cured composite material, forming the stringer and having a raised portion protruding from at least one flange; b) arranging, on the tool, a plurality of second layers of uncured or pre-cured composite material forming the skin; c) making a face of the skin and the flange of the stringer adhere to each other; d) applying a predetermined temperature and pressure on the assembly to compact the layers together, possibly curing the uncured material and rigidly joining the skin to the stringer; and e) performing a cutting operation on the free end side edge/s of the flange in a slanted direction.

7 Claims, 14 Drawing Sheets

(51) Int. Cl.
*B29C 70/54* (2006.01)
*B29C 70/88* (2006.01)
*B64F 5/10* (2017.01)
*B29D 99/00* (2010.01)

(52) U.S. Cl.
CPC ............... *B64C 1/064* (2013.01); *B64F 5/10* (2017.01); *B29D 99/0014* (2013.01)

(56) References Cited

U.S. PATENT DOCUMENTS

| | | |
|---|---|---|
| 10,442,153 B2 | 10/2019 | Shinozaki et al. |
| 10,661,507 B2 * | 5/2020 | Vichniakov ....... B29C 66/00145 |
| 2008/0087768 A1 | 4/2008 | Lloyd |
| 2012/0100343 A1 * | 4/2012 | Borghini-Lilli .... B29D 99/0014 428/156 |
| 2016/0176500 A1 * | 6/2016 | Ross ................. B29D 99/0014 428/157 |
| 2019/0030842 A1 * | 1/2019 | Miranda ................. B29C 70/44 |
| 2019/0193371 A1 | 6/2019 | Shinozaki et al. |
| 2019/0263496 A1 * | 8/2019 | Cheng .................... B64C 1/064 |

\* cited by examiner

PROCESS FOR MANUFACTURING A STRUCTURAL COMPONENT IN COMPOSITE MATERIAL STIFFENED WITH AT LEAST ONE STRINGER

CROSS-REFERENCE TO RELATED APPLICATIONS

This Patent Application is a U.S. national stage application under 35 U.S.C. § 371 of PCT Application No. PCT/IB2021/056811, filed on Jul. 27, 2021, which claims priority from Italian Patent Application No. 102020000018136 filed on Jul. 27, 2020. The entire disclosure of the aforementioned priority applications are incorporated herein by reference in their entireties.

TECHNICAL SECTOR

This invention concerns a process for manufacturing a structural component in composite material, stiffened with at least one stringer.

In particular, this description will explicitly refer to the manufacture of a fuselage, a wing, portions thereof or other structural parts of an aircraft without the general applicability hereof being lost on account thereof.

PRIOR ART

Structural components used in aviation, such as fuselages, wings and portions thereof, are known to be made of composite material. The use of this material is made necessary by the need to reduce the overall weight of aircraft and eliminate or minimise corrosion problems in aircraft.

The composite material used in the most common solutions consists of fibre material, for example carbon fibre that has been pre-impregnated with epoxy, BMI or some other non-cured or pre-cured material. The said material is deposited in moulds and then processed under temperature and pressure. Other methods use dry-fibre that is generally impregnated with fluid resin according to a well-known process (for example by means of the method known as "Resin Transfer Moulding" or RTM).

Typically, structural components of the type described above, such as fuselages, wings or parts thereof, are manufactured by joining a composite skin with a plurality of stiffening stringers, which are also made of composite material and are generally positioned parallel to a predefined direction in which the said structural component extends itself.

In particular, each stringer is usually defined by a thin-walled longitudinal profile, comprising:
  one or two longitudinal lateral flanges suitable to be joined to the skin; and
  a raised portion of predefined geometry protruding transversely with respect to the flange/s.

The stringers that are most commonly used in the industry have an omega, T-, L-, J- or Z-cross-section.

In order to produce the leather, a plurality of layers of said uncured composite material are laminated together.

Similarly, in order to produce the stringers, many layers of uncured composite material are placed on a suitably shaped forming tool.

Once the skin and stringers have been manufactured, they are brought into contact with the skin and joined to the skin at the respective flange/s.

In this first embodiment, the assembly thus formed is then subjected to a co-curing operation in an autoclave by applying high pressure and high temperatures, so as to cure the composite material, compact the above-mentioned layers together and cause the stringers to be joined to the skin.

In practice, each stringer is applied rigidly and integrally to one face of the skin, normally but not exclusively the face defining the inner wall of the skin, that is to say the face that is being used facing the inside of the fuselage or wing.

The structural component is manufactured in this manner.

In another embodiment, the stringers can be pre-cured after they have been formed and then joined to the skin by using a structural adhesive. The assembly thus formed is brought into an autoclave and subjected to high pressure and high temperatures to cure the fresh composite material, compact the different layers together, and cause the stringers to bond to the skin. This operation is commonly referred to in the industry as 'co-bonding'.

Co-bonding can also be performed by pre-curing the skin alone and bonding it to uncured stringers with structural adhesive.

In a further embodiment, both the skin and the stringers can be pre-cured and then joined with structural adhesive. This operation is commonly referred to in the industry as "bonding" and either can take place in an autoclave or take place cold.

The skin and the stringers can also be joined in different ways.

A first mode, known as "Inner Mould Line" or IML, involves the use of a curing tool, often referred to as a "mandrel", whose outward shape defines the internal surface of the portion of the fuselage or wing to be manufactured. In practice, the mandrel has respective longitudinal cavities, each capable of housing a stiffening stringer.

Once the stringers have been positioned in the aforementioned cavities of the mandrel, it may be necessary, depending on the geometry of the stringers themselves, to insert different types of inserts, known in the industry as "bladders" and "noodles", into the various cavities that may be formed following the positioning of the stringers on the mandrel; these inserts are designed to keep the various components in position and prevent them from being crushed due to high pressure when passing through the autoclave.

At this point, the assembly consisting of the mandrel, stringers and inserts is covered with the relative portion of skin that will form the external surface of the aforementioned portion of the fuselage or wing. If the stringers or skin, or both, have been pre-cured, a layer of structural adhesive is placed between the skin and the said stringers.

Therefore, the mandrel defines the innermost component in the resulting assembly.

At this point, the entire assembly undergoes a co-curing, co-bonding or bonding operation, as defined above, during which the stringers are firmly coupled and joined onto the skin.

During this operation, the bladders, which are made of an elastically deformable material and which may be either cavity or solid internally, expand so as to counteract the pressure applied to the outside of the assembly during the autoclaving operation. More precisely, in the case of cavity bladders, the inside thereof is locked by means of openings to the autoclave's inside, so that both the outside of the assembly and any cavities in the stringers are subjected to the same pressure. In the case of solid bladders, the bladders are made of a material that expands with the increasing temperature.

As an alternative to cavity bladders, tubular bags may be used, the inside of which is locked to the autoclave's inside.

The noodles continue to be integrated into the structure, while the bladders are extracted at the end of the curing phase.

A second mode, known as 'Outer Mould Line' or OML, involves the use of an 'external' mandrel: the process is similar to IML, except that the mandrel surrounds and supports the outer surface of the skin.

The phase of trimming the longitudinal side edges of the flanges of the stiffening stringers, which is carried out while the stringers are being formed on the forming tool, is also known in the industry.

In particular making a 90° cut of these edges in relation to a support plane supporting the stringer while the aforementioned edges are being cut, said cut being defined by the forming tool, is known in the industry. This type of cut is the easiest to make, since the support plane is normally a horizontal plane and the cut is made from top to bottom.

However, once the stringers are joined to the skin during the co-curing, co-bonding or bonding operation, the 90° cut of the edges of the stringers leads to a rather pronounced surface discontinuity with respect to the inner surface of the said skin; therefore, the transfer of the operating loads from the stringers to the skin and vice versa is not optimal and can be improved.

At the same time, the fibres at the cut edge are uncovered, increasing the risk of moisture infiltrating the layers forming the stringers' flanges and/or the finished component that is being delaminated.

EP2886311A1, U.S. Pat. No. 10,442,153B2 and EP3549755A1 disclose processes for manufacturing structural components made of composite materials, as defined in the preamble to claim 1.

AIM AND ABSTRACT OF THE INVENTION

The aim of this invention is to disclose a process for manufacturing a structural component made of a composite material stiffened with at least one stringer, which is highly reliable and whose cost is limited, and which enables at least one of the problems specified above arising from processes of a known type described above to be solved.

According to this invention, this aim is achieved by a process for manufacturing a structural component made of a stiffened composite material having at least one stringer as claimed in claim 1.

BRIEF DESCRIPTION OF THE DRAWINGS

For the purpose of having a better understanding of this invention, certain preferred non-limiting embodiments are described below, purely by way of example and with the aid of the accompanying drawings, wherein.

DETAILED DESCRIPTION

Figure 1:
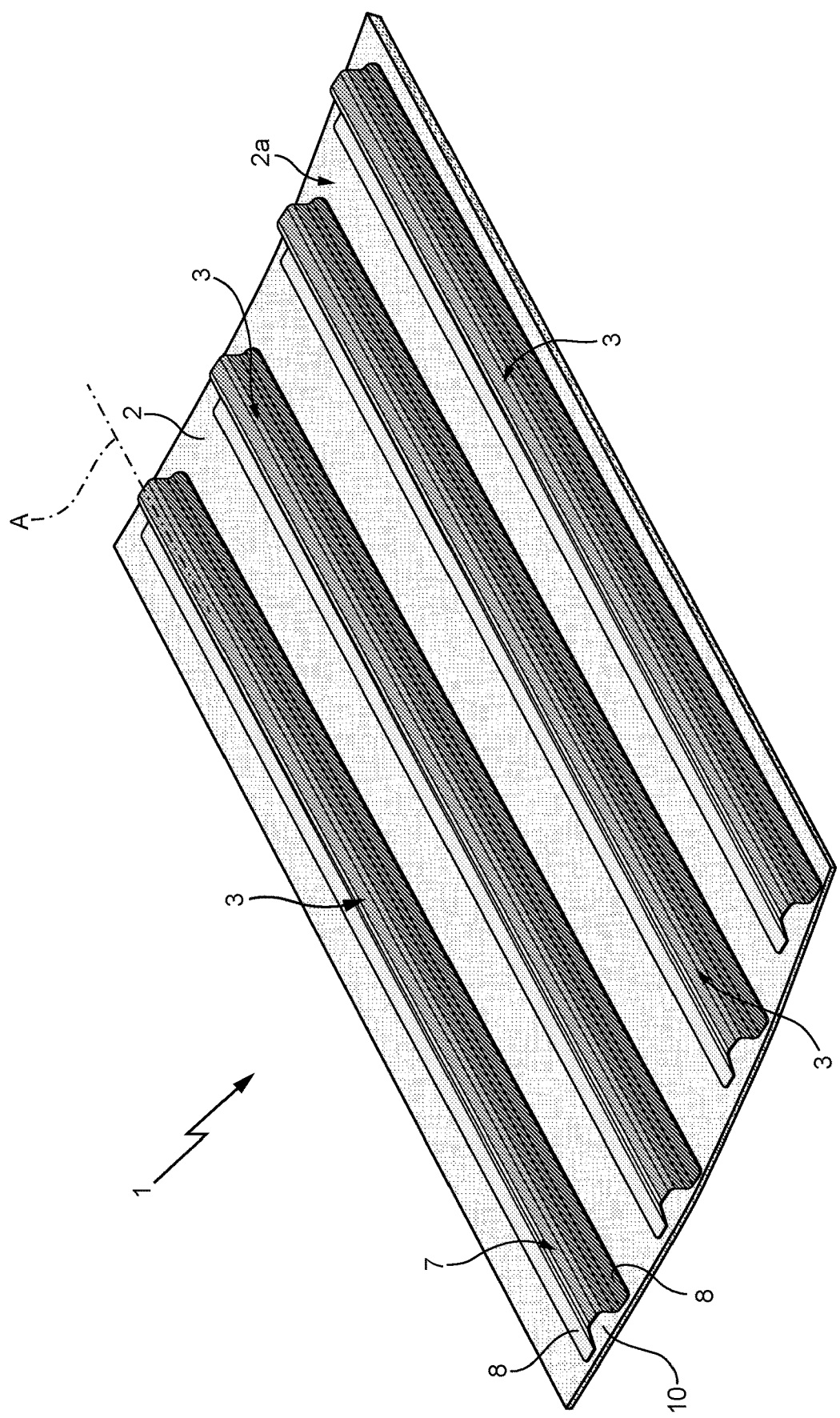
FIG. 1 is a perspective view of a structural component made of composite material, in particular a composite panel defining part of an aircraft fuselage manufactured by means of the manufacturing process disclosed by this invention.

FIG. 1 shows overall with 1 a first example of a structural component made of composite material manufactured by means of the process disclosed by this invention.

This description shall, in particular, explicitly refer, without the general applicability hereof being lost, to structural components used in aviation, for example an aircraft fuselage, wing or portion of a fuselage or wing, and a process for manufacturing such structural components.

According to the preferred embodiment described and shown herein, the structural component 1 is intended to form part of an aircraft fuselage and is defined by a panel comprising a composite skin 2 and a series of cavity longitudinal stiffening stringers 3 having a closed section, configured to stiffen the panel.

Each stringer 3 has an extension in a longitudinal direction that is significantly greater than the extension in the other two directions that are orthogonal to such longitudinal direction.

In the specific case shown herein, the aforementioned longitudinal direction of extension of the stringers 3 is, moreover, parallel in use to the axis of longitudinal extension of the fuselage formed at least in part by the structural component 1.

According to a possible alternative that has not been shown, the stringers 3 could be attached to the skin 2 in such a way that their longitudinal direction of extension is transverse or orthogonal to the longitudinal extension axis of the fuselage.

The use of composite structural components in the aircraft industry is dictated by the need to reduce the overall weight of aircraft and eliminate or minimize corrosion problems in aircraft.

In one embodiment, the composite material that is used is fibre material, for example carbon fibre, pre-impregnated with epoxy, BMI or other non-cured or pre-cured material. The material is deposited in moulds and then processed under temperature and pressure. Other methods use dry fibre that is generally impregnated with fluid resin according to a well-known process (for example the method known as "Resin Transfer Moulding" or RTM).

The solution described in FIGS. 1 to 9 concerns a process for manufacturing the structural component 1, which is obtained by rigidly and integrally applying the stringers 3 to the skin 2 in such a way that each stringer 3 forms with said skin 2 a closed-profile cavity.

In particular, this description will explicitly refer to the manufacture of a single panel defining a part of the aforementioned fuselage, without the general applicability hereof being lost.

More particularly, it will be assumed for simplicity's sake that such a panel is flat or substantially flat, that is to say that it extends along a flat or substantially flat surface. However, the structural and functional characteristics and steps of the procedure are to be considered equally applicable to a panel extending along a surface having a curved or rotating layout, for example along a substantially parabolic surface, a vaulted surface or, again, a (substantially) cylindrical or tapered surface.

In the latter cases, the skin 2 will have a (substantially) cylindrical or tapered shape (that is not shown), presenting a central longitudinal axis. The stringers 3 will be arranged along their respective longitudinal axes parallel to the central axis of the skin 2.

Structural component 1 could also be defined by a barrel intended to form a ring-shaped portion of the fuselage.

Furthermore, this description will explicitly refer, without the general applicability hereof being lost, to a manufacturing process of the type known as "Inner Mould Line" or IML, which is well-known per se and is not described in detail.

However, the steps of the process are equally applicable, once the necessary changes have been made, in the case (that is not shown) in which the structural component is manufactured according to a process of the type known as "Outer Mould Line" or OML, which is also well-known per se and not described in detail.

Figure 2:
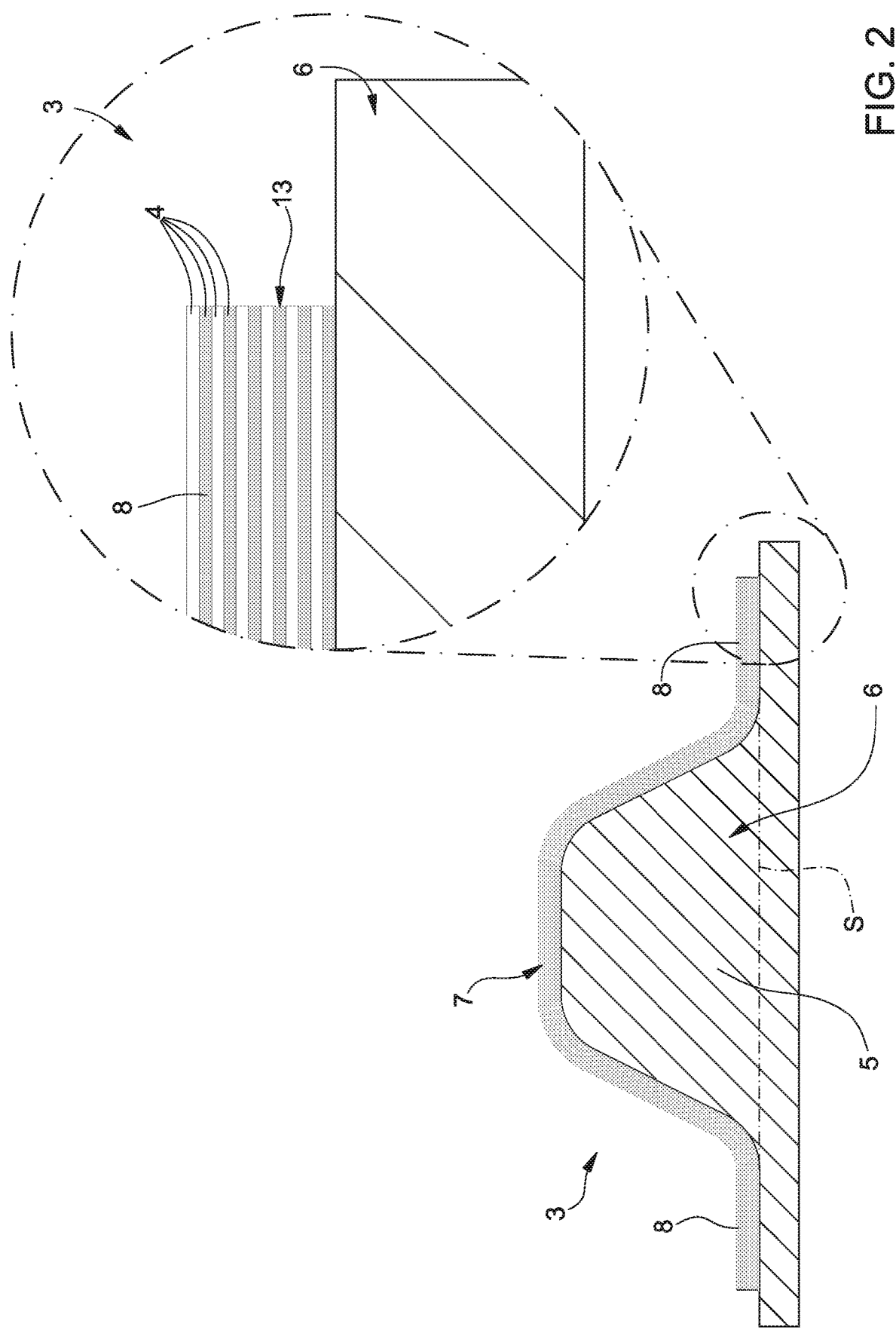
FIG. 2 is a cross-sectional view, enlarged in scale and with parts having been removed for the sake of clarity, of a stiffening stringer of the structural component depicted in FIG. 1 lying on a forming tool, while the said stringer is being formed.

With reference to FIG. 2, each stringer 3 is preferably made by arranging a plurality of layers 4 of uncured composite material on a shaped portion 5 of a tool, in particular a forming tool 6 specially configured to form the stringers 3.

In particular, each stringer 3 has a longitudinal axis A and comprises two lateral flanges 8, extending parallel to the respective axis A and along a single lying surface S, and a raised portion 7 centrally arranged between the flanges 8, protruding with respect to the latter and having a concave shape on one side.

As specified above, the non-limiting example described herein discloses a flat or substantially flat lying surface S. In an alternative embodiment that is not shown herein, the lying surface S could be curvilinear, that is to say it could be a surface of revolution obtained by rotating a curve about an axis parallel to the axis A of the stringer 3 under examination.

Therefore, in order to each form each stringer 3, the manufacturing process of the structural component 1 comprises the step of arranging a plurality of layers 4 of uncured composite material on the shaped portion 5 of the tool, which is in the aforementioned example the forming tool 6, so as to form said stringer 3.

According to this preferred and non-limiting embodiment, the stringers 3 have an omega-shaped cross-section.

Alternatively, the stringers 3 intended to create a closed cavity section with the skin 2 may have a different cross-sectional shape, for example a circular arc, semi-circular, rectangular, polygonal, semi-ellipsoidal, semi-oval shape, etc.

In order to form the skin 2, the process of manufacturing the structural component 1 comprises the step of laminating a plurality of layers (that are not shown) of uncured composite material.

Such lamination is normally carried out directly on a curing tool, which will be described below.

In order to make the panel defining the structural component 1, the manufacturing process further comprises the step of bringing into contact with each other a face 2a of the skin 2, parallel to the lying surface S, and therefore flat in the specific example, and the flanges 8 of each stringer 3, so as to form the respective closed profile cavities 10 (FIGS. 1 and 5) between the raised portion 7 of each stringer 3 and the skin 2 itself.

Furthermore, the stringers 3 are positioned parallel to a longitudinal direction of extension of the aircraft fuselage, as denoted above.

According to this preferred embodiment, the step of bringing the skin 2 and the stringers 3 into contact with each other is carried out by placing each previously formed stringer 3 and skin 2 on a special curing tool 12 (FIG. 5) that is distinct and separate from the forming tool 6 used to make the stringers 3.

Figure 5:
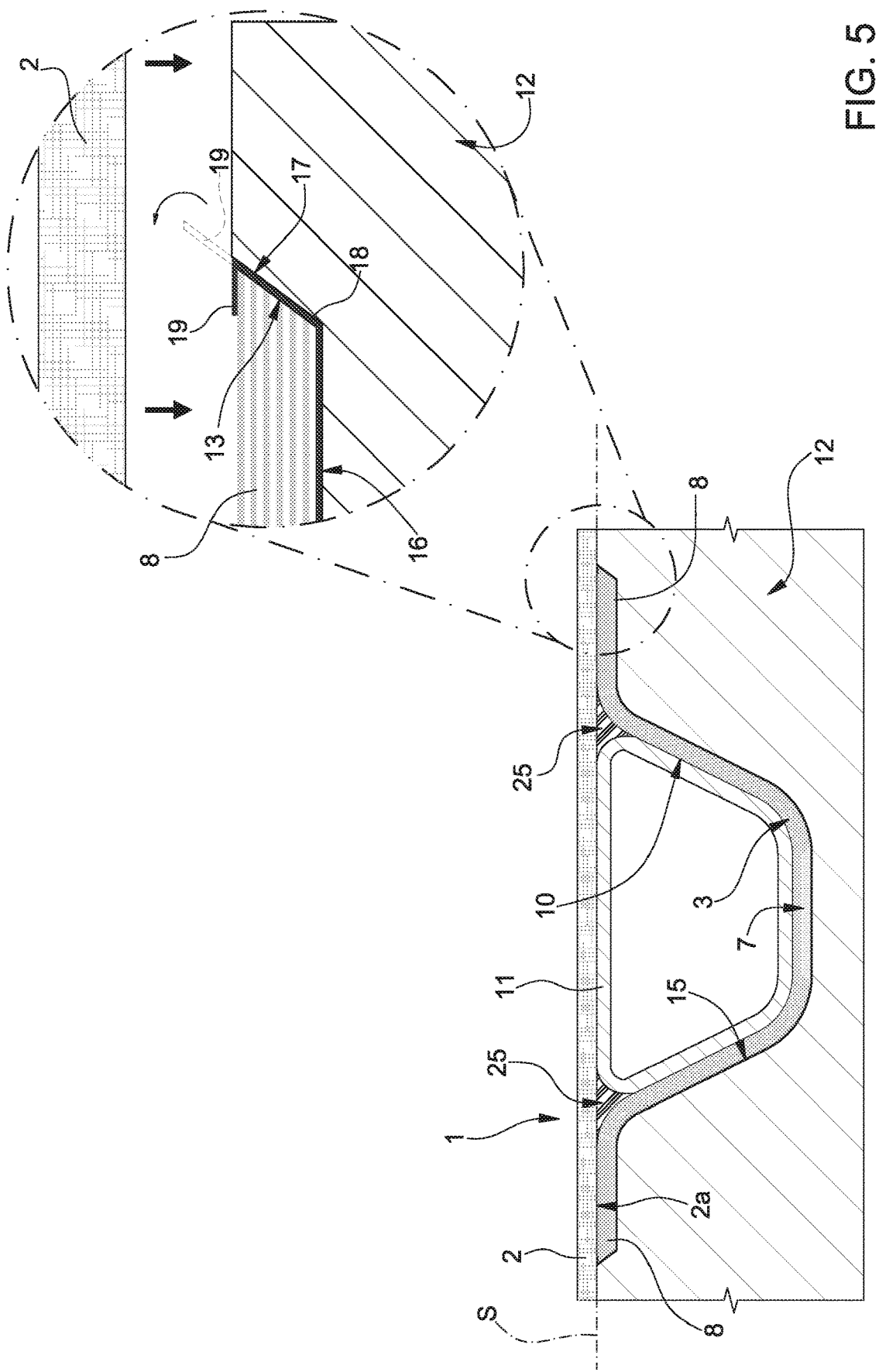
FIG. 5 is a cross-sectional view of the structural component depicted in FIG. 1 lying on a curing tool while the component is being cured.

In particular, the curing tool 12 is defined by a body (commonly known as a "mandrel") comprising a wall extending along the lying surface S and presenting a plurality of longitudinally shaped slots or grooves 15 (only one of which is shown in FIG. 5) configured to receive the previously formed stringers 3 prior to the step of bringing the skin 2 and stringers 3 into contact with each other and supporting them during the same step, as well as in a subsequent curing step or operation, as better described below.

In the preferred embodiment described and shown herein, the curing tool 12 is therefore flat, since the lying surface is flat.

In an alternative embodiment that is not shown, the curing tool 12 could be defined by a curved, or (substantially) cylindrical or tapered body, depending on the shape of the lying surface.

Conveniently, the manufacturing process further comprises, after the step of forming the stringers 3 and before the step of bringing the skin 2 and stringers 3 into contact with each other, the step of placing a longitudinal insert 11 (FIG. 5), commonly known as a "bladder", within the raised portion 7 of each stringer 3, such that the insert 11 itself is entirely housed within the cavity 10 once the step of bringing the skin 2 and stringers 3 into contact with each other is completed.

In particular, the insert 11 is made of an elastically deformable material and can be expanded while the structural component 1 is subsequently being co-cured so as to maintain the cavity 10, as will be explained in more detail below.

More particularly, the step of positioning the inserts 11 is performed when the stringers 3 are arranged on the curing tool 12 within the respective shaped slots 15.

After the inserts 11 have been placed, additional inserts 25, commonly known as "noodles", are placed at the corners between them and the skin 2; said "noodles" act as fillers and are made of uncured composite material.

The aforementioned co-curing operation consists in applying high pressure and temperature (about 6 bar and 180° C.) to the assembly composed of the skin 2, stringers 3, inserts 11, 25 and the curing tool 12, so as to cure the composite material, compact the aforementioned layers among themselves and join the stringers 3, the inserts 25 and the skin 2, in particular applying in a rigid and integral manner the stringers 3 to the face 2a of the skin 2.

Accordingly, the manufacturing process comprises the step of applying high temperature and pressure to the outside of said assembly and to the inside of the cavity 10 so as to cure the composite material and compact the layers together, while maintaining the cavity 10.

In this regard, the manufacturing process comprises, following the step of bringing the skin 2 and the stringers 3 into contact with each other and during the step of applying temperature and pressure, the step of expanding each insert 11 against the boundary walls of the respective cavity 10, in order to maintain said cavity 10 during the said curing operation.

In particular, since each insert 11 is defined in the aforementioned example by an elastically deformable cavity body, the step of the expansion thereof is carried out by applying pressure to the inside of the insert 11 itself, in particular by applying the same pressure applied to the outside of said assembly during the curing step.

More particularly, each insert 11 is provided, in a manner known and not described in detail, with valves connecting the inside of the said insert 11 with the outside thereof; in this way, during the curing step, the inside of the inserts 11 is subject to the same temperature and pressure conditions as the curing environment. Therefore, a possible deformation of the skin 2 towards the cavities 10, caused by the high pressure to which the structural component 1 is subjected during the co-curing operation, is avoided and the cavities 10 themselves are thus maintained.

According to an alternative embodiment that is not shown, the inserts 11 may be defined by solid bodies made of an elastically deformable and temperature-sensitive material, in particular a thermo-expandable material.

Therefore, in such a case, the expansion step is performed simply by exposing the insert 11 to the curing temperature, which will thus press against the walls delimiting the cavity 10.

According to an alternative embodiment that is not shown, the inserts 11 could be defined by simple tubular bags inside which the same pressure is applied as in the curing environment.

At the end of the co-curing operation, the resulting panel is separated from the curing tool 12 and the inserts 11 are removed.

As an alternative to the co-curing operation, the skin 2 and stringers 3 could be joined by co-bonding or bonding operations.

In the first case (co-bonding), the stringers 3 (or skin 2) could be cured and then joined to the uncured skin 2 (or uncured stringers 3) using a structural adhesive. The thus formed assembly would then be placed in an autoclave and subjected to high pressure and temperature to cure the fresh composite material, compact the different layers and cause the stringers 3 to join to the skin 2.

In the second case (bonding), both skin 2 and stringers 3 could be pre-cured and then joined by structural adhesive. This operation could be carried out either by autoclave-bonding or cold-bonding.

The trimming phase of the free end side edges 13 of each stringer 3, wherein each side edge 13 is defined by the free end of a respective flange 8 of the stringer 3, parallel to the axis A, spaced from the raised portion 7 and extending transversely to the lying surface S, is also known in the industry.

In particular, it is known to carry out a 90° cut of said side edges 13 with respect to a support plane 14 supporting the stringer 3 during the cutting operation and therefore with respect to the lying surface S of the flanges 8.

In the described example, the support plane 14 is defined by a flat upper face of the forming tool 6 adjacent to the shaped portion 5.

Figure 3:
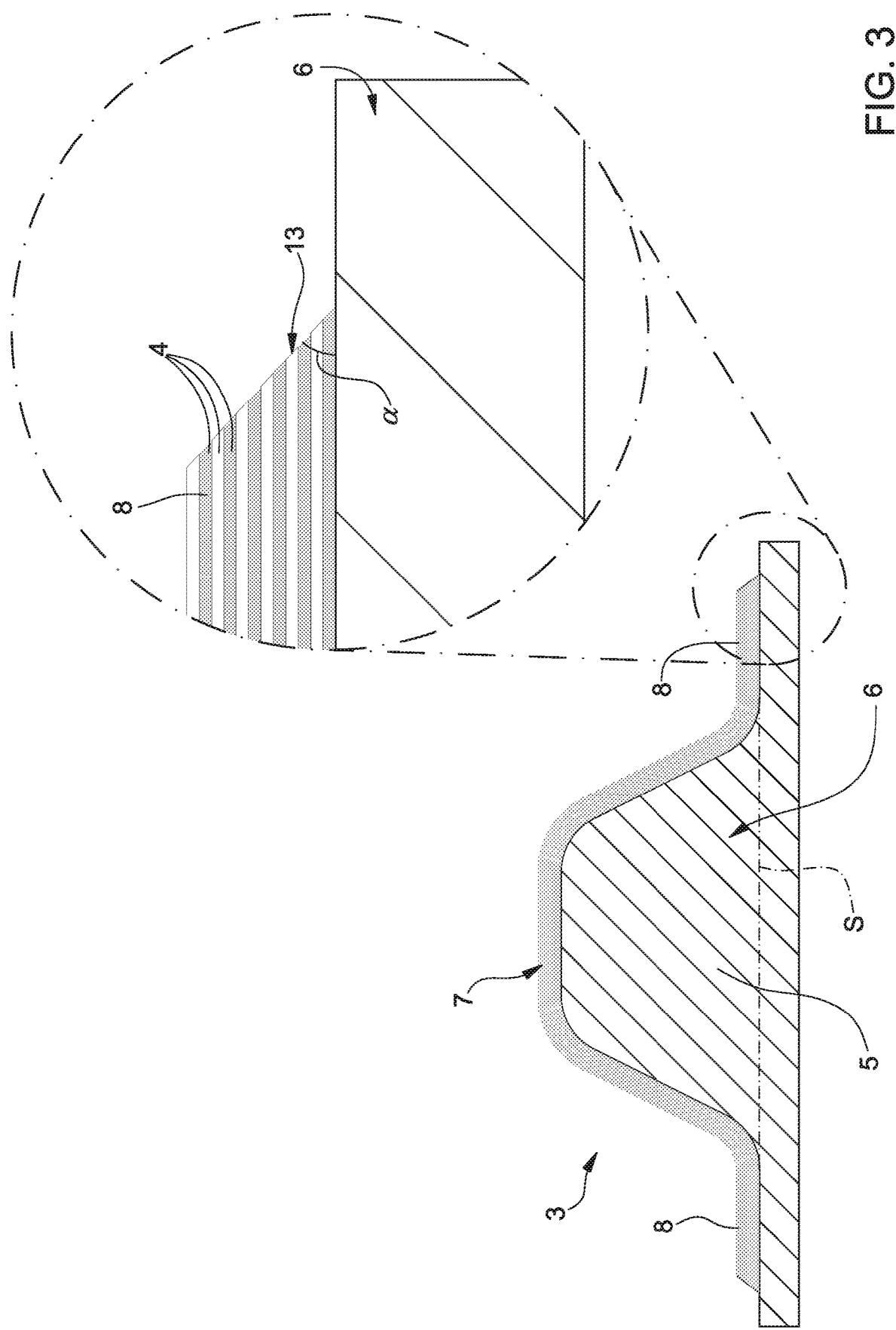
FIG. 3 is a cross-sectional view, enlarged in scale and with parts removed for the sake of clarity, of the stiffening stringer depicted in FIG. 2 during a subsequent operating condition.

According to an important embodiment of this invention, and with reference to FIG. 3, the process of manufacturing the structural component 1 comprises, after each stringer 3 has been formed, that is to say the step of arranging a plurality of layers 4 of uncured composite material on the shaped portion 5 of the forming tool 6, and before bringing the skin 2 and the stringers 3 into contact with each other, the step of cutting the side edges 13 of free ends of the flanges 8 in a slanted direction with respect to the lying surface S; said lying surface S is the surface along which the flanges 8 extend, in such a way that the cut layers 4 of the flanges 8 present, during the course of the subsequent step of bringing the skin 2 and the stringers 3 into contact with each other, an extension, along or parallel to the lying surface S itself, that increases while progressing towards the skin 2.

In other words, as shown in FIG. 3, the side edges 13 are cut in a slanted direction with respect to the lying surface S, which is flat in the case shown above, so that each cut side edge 13 defines, on that side of the said edge side 13, an α acute angle with respect to the surface of the respective flange 8 placed on the forming tool 6, that is to say with respect to the lower surface of the respective flange 8 shown in FIG. 3.

As can be seen in FIG. 5, during the subsequent phase of bringing the skin 2 and the stringers 3 into contact with each other, the cut flanges 8 have an extension, measured along the lying surface S, increasing towards the face 2a of said skin 2.

In practice, each flange 8, in a section that is orthogonal to the axis A of the respective stringer 3, has a substantially semi-trapezoidal profile, wherein the slanted side is defined by the respective cut side edge 13, whose major base is intended to touch the face 2a of the skin 2.

The particular cutting configuration of the side edges 13 according to this invention makes it possible to avoid an accentuated surface discontinuity of the stringer 3 with respect to the face 2a of the skin 2, once the parts are integrally coupled. On the contrary, such shear shape determines a smoother connection between the flanges 8 of each stringer 3 and said skin 2, also improving the distribution of stresses in the junction area between the stringers 3 and the skin 2. In particular, the structural loads in use are better distributed from the stringers 3 to the skin 2 and vice versa.

Furthermore, the stringers 3 that have thus been obtained are easier to handle and to insert/extract in the curing tool 12, and in particular in the shaped cavity 15 of said curing tool 12, which ends at its opposite lateral ends with respective obtuse chamfers having the same inclination as the side edges 13. As a result thereof, said shaped cavity 15 may present a simple shape without acute chamfers and surface discontinuities.

According to this preferred and non-limiting embodiment, the step of cutting the side edges 13 is carried out when the relevant stringer 3 is arranged on the forming tool 6.

As can be seen in FIG. 5, the manufacturing process comprises, after each stringer has been formed 3 and the lateral edges cut 13 and before the skin 2 and the stringers 3 have been brought into contact with each other, the step of arranging each stringer 3 in a shaped cavity of the tool, in particular in the shaped cavity 15 of the curing tool 12, which has been shaped to accommodate the formed and cut stringer 3.

In detail, each shaped cavity 15 has an outer profile, that is to say a wall delimiting the said cavity, which follows, that is to say traces, the profile of the side of the formed and cut stringer 3 opposite to the one intended to be applied to the face 2a of the skin 2.

In practice, each shaped cavity 15 is specially shaped to accommodate the stringers 3 having side edges 13 that have already been cut.

As specified above, due to the particular shape in which the flanges 8 is cut that is disclosed by this invention, the profile of the shaped cavity 15 is rather simple and free of sharp chamfers and surface discontinuities.

Advantageously, the manufacturing process also includes the step of coating the side edges 13 of the cut layers 4, that is to say the cut flanges 8, with a composite material coating.

Such a composite coating is, at the end of the manufacturing process described herein, a constituent or integral part of the final structural component 1.

Figure 4:
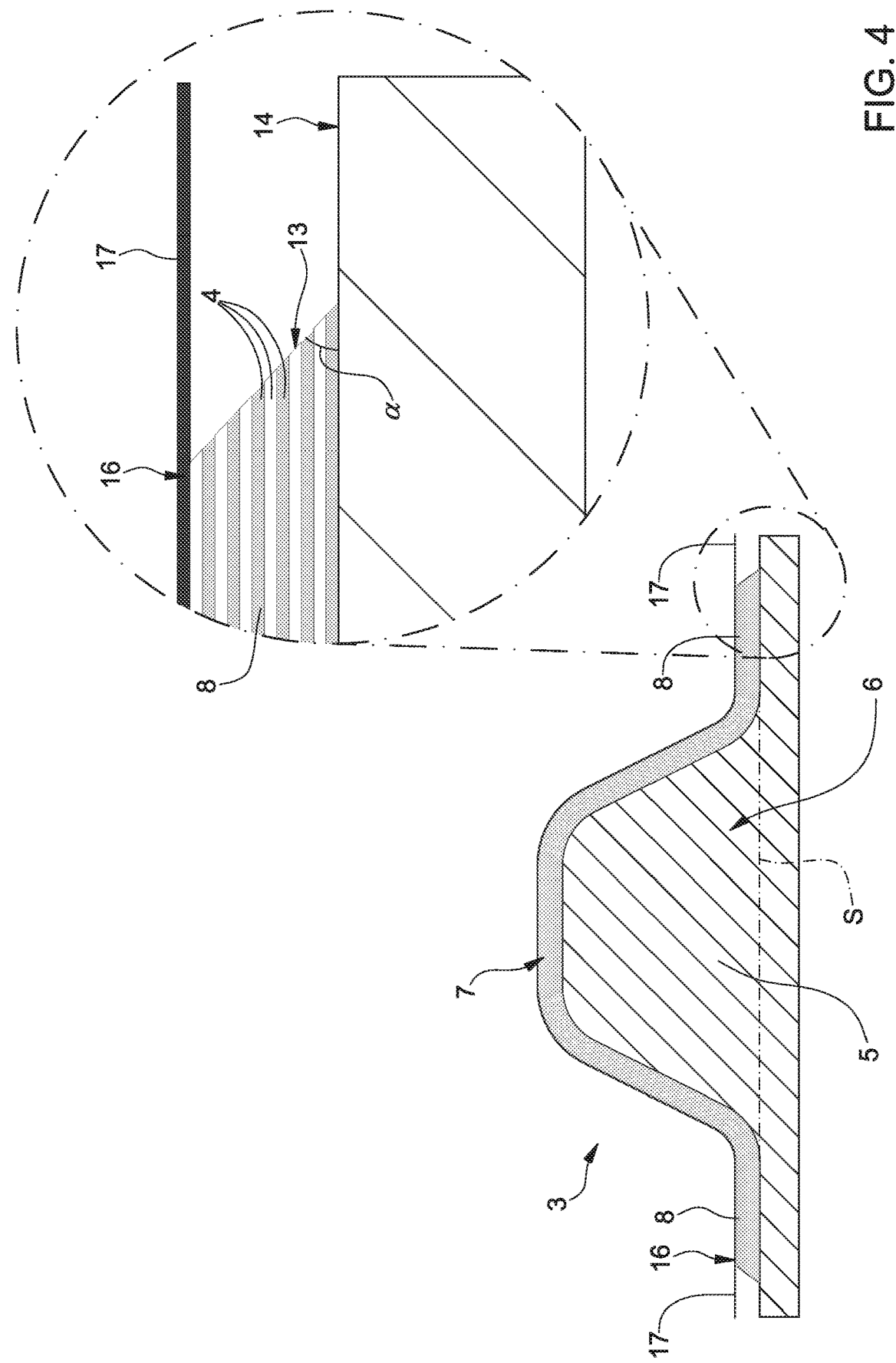
FIG. 4 is a cross-sectional view, enlarged in scale and with parts removed for the sake of clarity, of the stiffening stringer depicted in FIG. 3 during a subsequent operating condition.

In particular, as shown in FIG. 4, the manufacturing process comprises, after each stringer 3 has been formed and the side edges 13 cut and before the skin 2 and the stringers 3 have been brought into contact with each other, the step of laminating a further layer 16 of composite material forming the relevant stringer 3 that has been applied to the opposite side of the stringer 3 with respect to the side intended to be applied to the face 2a of the skin 2. More precisely, said further layer 16 defines the outermost layer of the stringer 3, that is to say the layer arranged on the "convex" side of the said stringer 3.

The further layer 16 has respective opposite lateral end flaps 17 protruding with respect to the cut side edges 13 of the flanges 8. Said flaps 17 therefore define the said composite material coating of the side edges 13 of the cut layers 4.

Therefore, the step of covering the side edges 13 is carried out by folding the flaps 17 over the respective cut side edges 13 to cover and seal them outwards.

In greater detail, according to the solution shown in FIG. 5, first portions 18 of the flaps 17 cover, during the folding of the flaps 17 of the further layer 16, the cut side edges 13 of the respective wings 8; and second portions 19, which are still protruding from the cut side edges 13 themselves, are folded over the respective flanges 8 so as to interpose themselves, during the step of bringing the skin 2 and the stringers 3 into contact with each other, between the skin 2 and said stringers 3.

In practice, the flaps 17 are substantially folded in a "C"-shape around the cut side edges 13 of the flanges 8, so as to cover the layers 4 by sealing them outwards.

Figure 6:
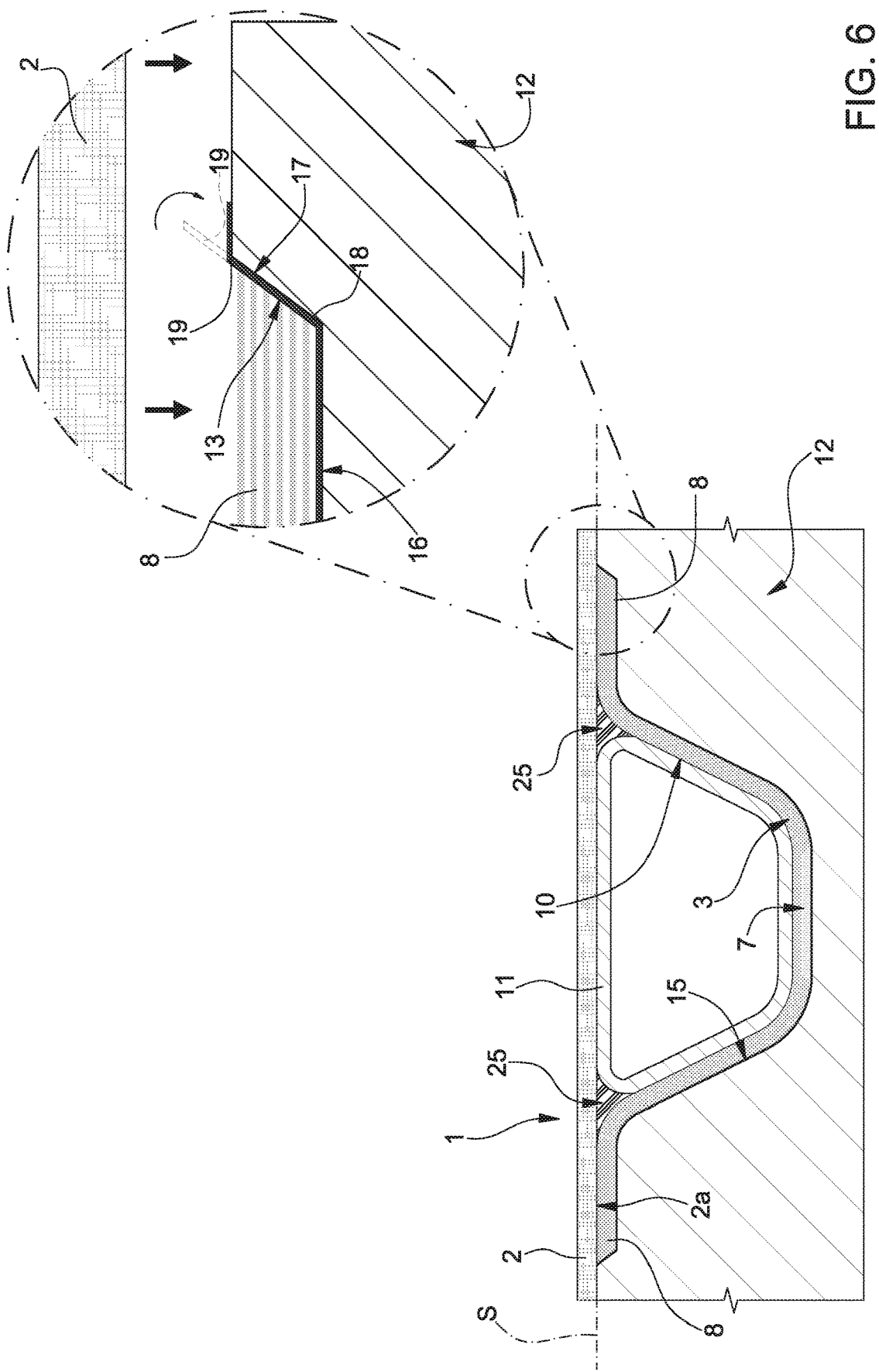
FIG. 6 is a Figure similar to FIG. 5 depicting a possible variant of the step shown therein.

Alternatively, according to the solution shown in FIG. 6, the second portions 19 of the flaps 17 are folded on the opposite side of the respective flanges 8 while the flaps 17 of the further layer 16 are being folded, that is to say on the curing tool 12, so as to interpose themselves between the skin 2 and the said curing tool 12 while the skin 2 and the stringers 3 are being brought into contact with each other.

In practice, the flaps 17 are substantially folded in a "Z"-shape around the cut side edges 13 of the flanges 8, so as to cover the layers 4 by sealing them outwards.

The fibres that remain uncovered as a result of cutting the side edges 13 are thus protected. This reduces or eliminates the risk of intrusion of moisture or other fluids between the layers 4 as well as the risk of the structural delamination of the finished component 1.

Figure 7:
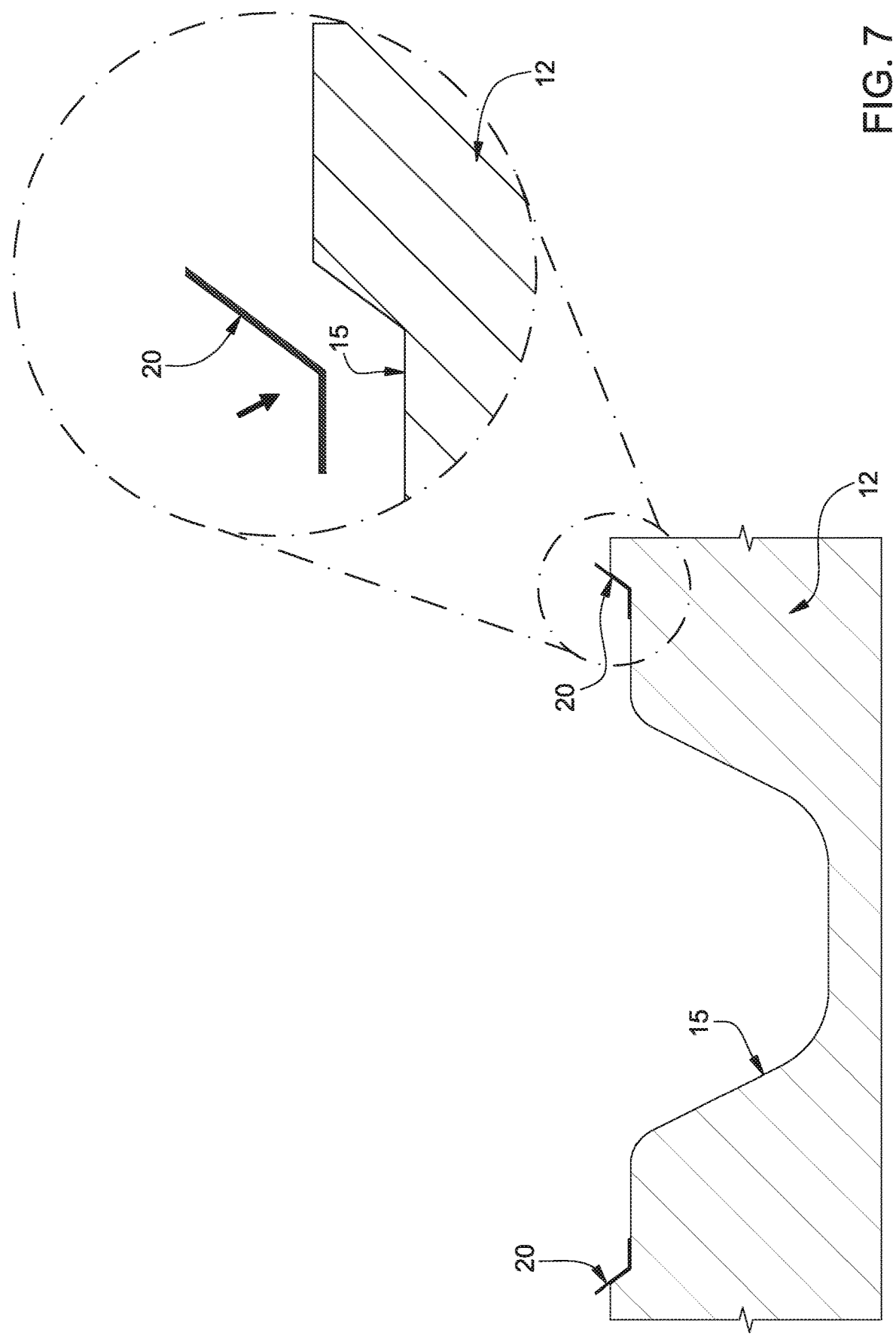
FIG. 7 is a cross-sectional view of a curing tool used during a step in the manufacturing process described in an alternative embodiment of this invention.
Figure 8:
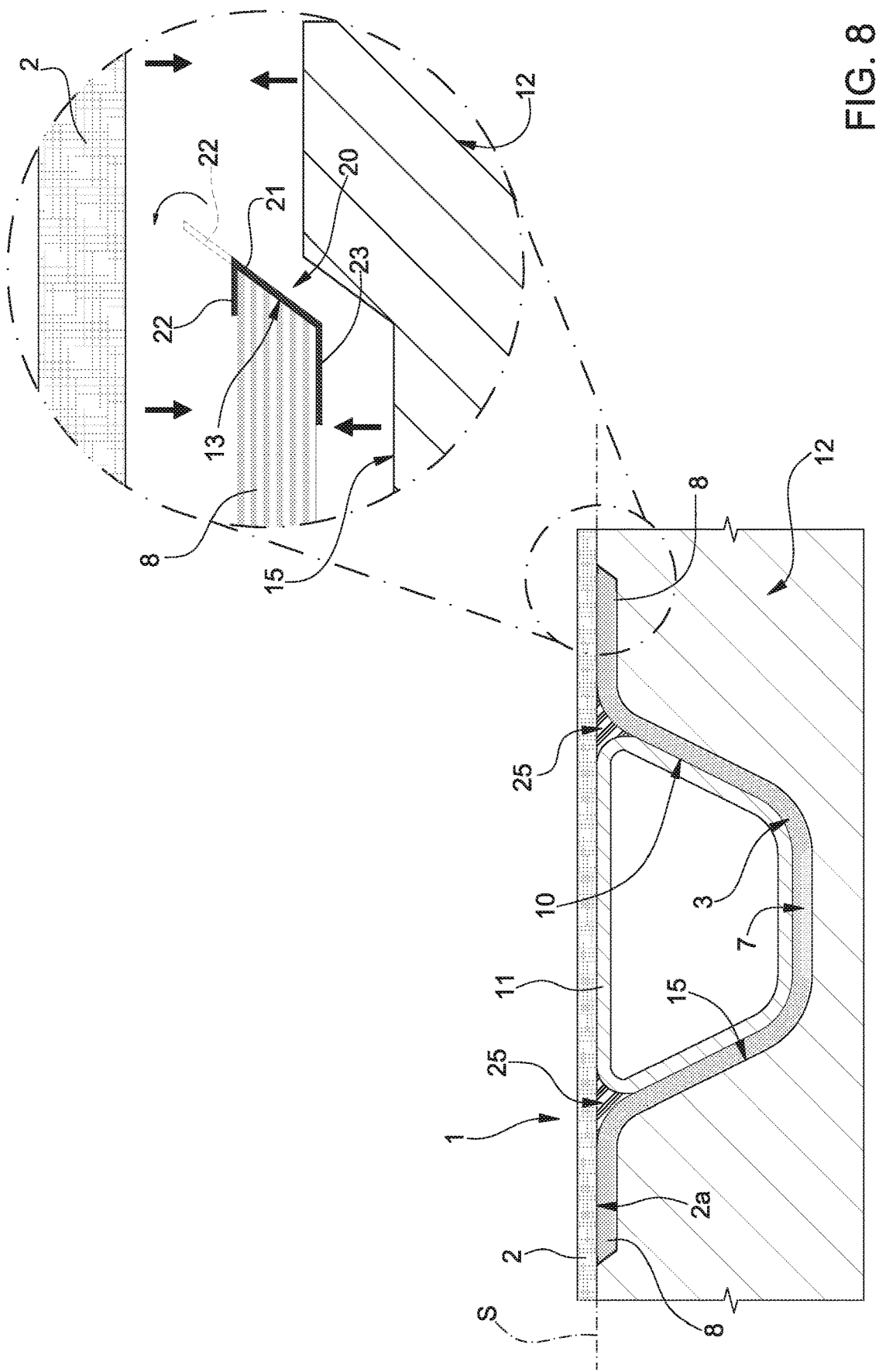
FIG. 8 is a cross-sectional view of the structural component depicted in FIG. 1 lying on the curing tool depicted in FIGS. 5 and 6 during the curing phase described in an alternative embodiment of the manufacturing process disclosed by this invention.
Figure 9:
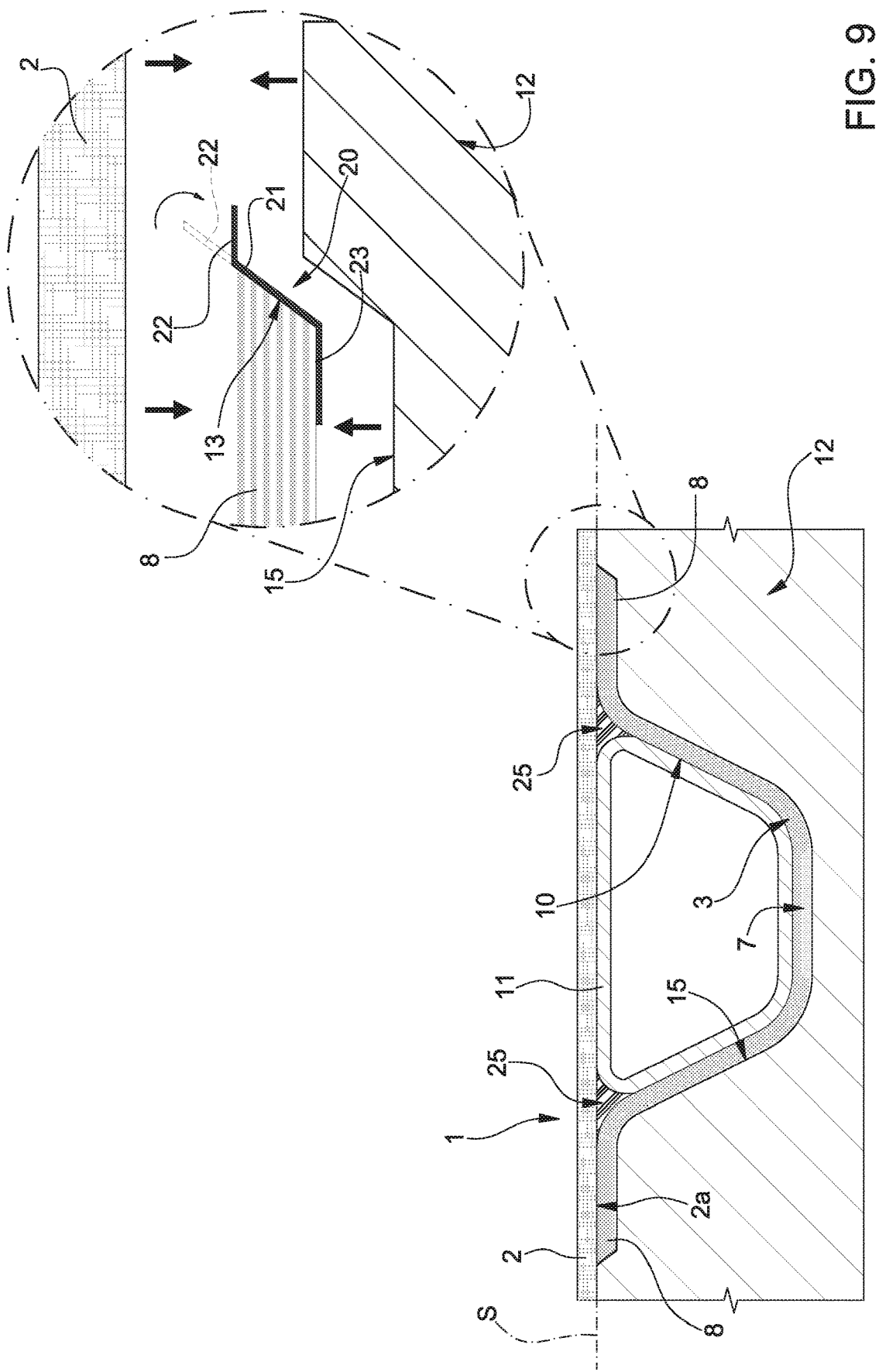
FIG. 9 is a Figure similar to FIG. 8 depicting a possible variant of the step shown therein.

With reference to FIGS. 7 to 9, a step of the aforementioned manufacturing process of the structural component 1 will be shown and described below in an alternative embodiment of this invention.

In particular, according to this alternative embodiment of the manufacturing process, the step of covering the side edges 13 of the flanges 8 is carried out by applying patch elements 20 made of uncured composite material on the cut side edges 13 so as to cover them and seal them outwards. In this case, the patch elements 20 define the said composite material coating of the side edges 13 of the cut layers 4.

In particular, the patch elements 20 are defined by thin-walled longitudinal inserts of uncured composite material.

Preferably, as shown in FIG. 7, the patch elements 20 are positioned in the shaped cavity 15 of the curing tool 12, particularly at the chamfers of the cavity that will accommodate and support the cut side edges 13 of the flanges 8.

Therefore, the patch elements 20 are applied on the side of the relevant stringer 3 that is opposite to the one intended to be applied to the face 2a of the skin 2.

In particular, the patch elements 20 are positioned so as to protrude from the cut side edges 13 of the flanges 8.

As can be seen in the solution of FIG. 8, the first portions 21 of the patch elements 20 that cover the cut side edges 13 and the second portions 22 that are still protruding from said cut side edges 13 themselves are folded over the respective flanges 8 while the patch elements 20 are applied to the cut side edges 13, so as to interpose themselves between the skin 2 and the respective stringers 3 while the skin 2 and the stringers 3 are being brought into contact.

Furthermore, each patch element 20 comprises a third portion 23 folded over the respective flange 8 on the side that is opposite to the respective second portion 22; in practice, the third portions 23 are interposed between the respective stringer 3 and the shaped cavity 15 of the curing tool 12 when the stringer 3 is arranged on said curing tool 12.

In practice, the patch elements 20 are substantially folded in a "C"-shape around the cut side edges 13 of the flanges 8, so as to cover the layers 4 by sealing them outwards.

Alternatively, according to the solution shown in FIG. 9, the second portions 22 are folded on the opposite side of the respective flanges 8, that is to say on the curing tool 12, while the patch elements 20 are being folded, so as to interpose themselves between the skin 2 and the said curing tool 12 while the skin 2 and the stringers 3 are brought into contact with each other.

In practice, the patch elements 20 are substantially folded in a "Z" shape around the cut side edges 13 of the flanges 8, so as to cover the layers 4 by sealing them outwards.

FIGS. 10 to 13 show, in cross-section and during a co-curing step, other types of structural components, which are respectively denoted 1', 1", 1''', 1'''' and which can be obtained by a process disclosed in this invention.

The structural components 1', 1", 1''', 1'''' and their manufacturing processes will be described below only insofar as they differ from each other and from structural component 1 as well as from the manufacturing methods that have been described above, indicating with the same reference numbers the parts that are equal or equivalent to parts that have already been described.

It should also be noted that, as has been already been seen in connection with structural component 1, the final co-curing of structural components 1', 1", 1''', 1'''' could also be replaced by the autoclave co-bonding or cold co-bonding or bonding thereof.

Figure 10:
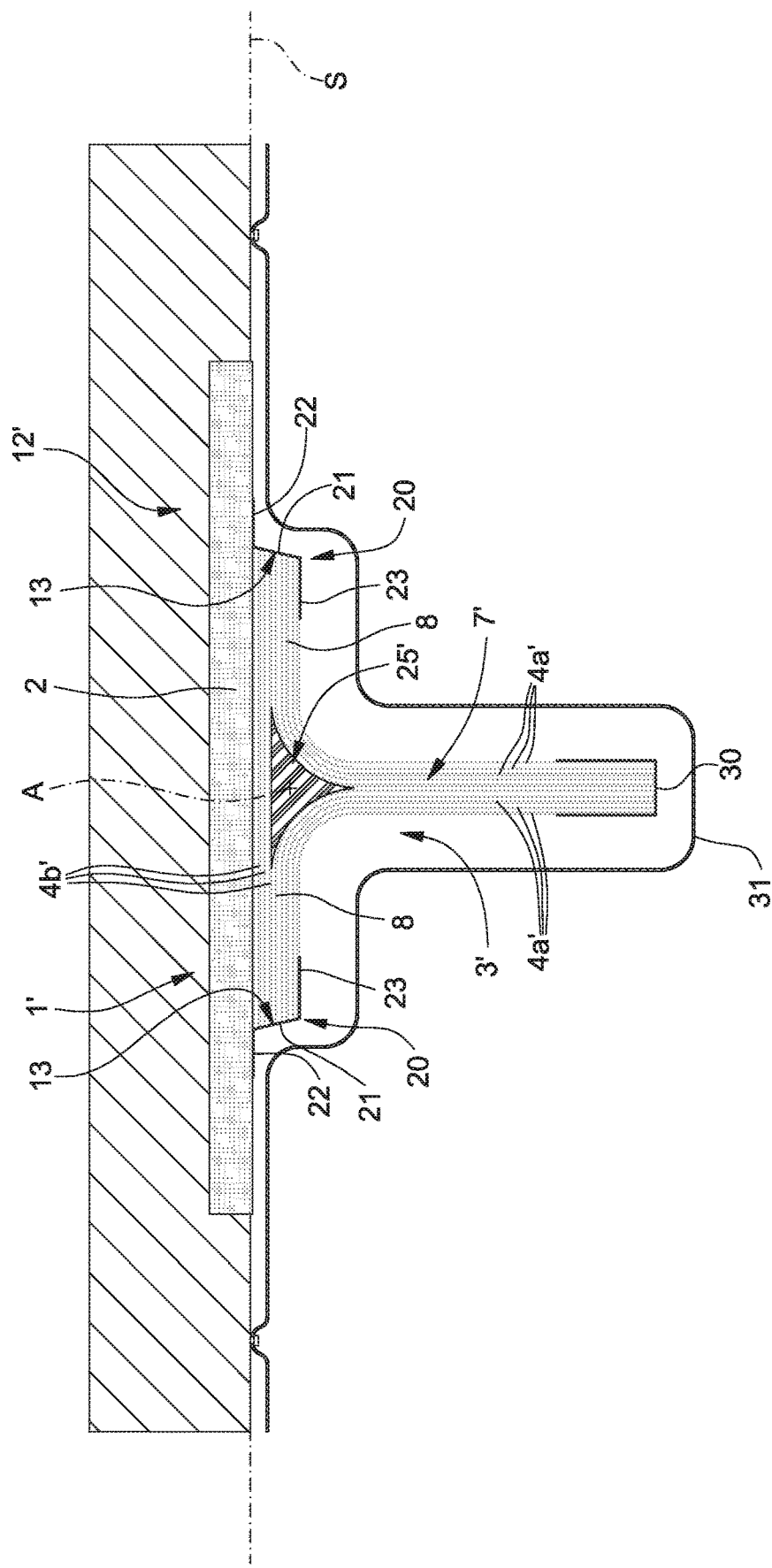
FIGS. 10 to 13 are cross-sectional views of different types of structural components lying on the respective curing tools during the corresponding curing phases described in the respective further alternative embodiments of the manufacturing process disclosed by this invention.

With regard to FIG. 10, the structural component 1' comprises a skin 2 identical to the one described above and a stringer 3' whose geometry is different from that of the stringer 3.

More precisely, the stringer 3' has a longitudinal axis A and a cross-sectional area transverse to said longitudinal axis A that is substantially T-shaped. The stringer 3' includes two lateral flanges 8 that are identical to the flanges 8 of the stringer 3, and a raised portion 7' with a thin flat sheet, extending substantially in a direction orthogonal to the flanges 8 and to the lying surface S.

The stringer 3' is obtained by laminating on a special forming tool (that is known in itself and that has not been shown):

- two sets of layers 4a' of uncured L-shaped composite material opposite each other, each consisting of two straight sections at right angles to each other at the bases and the backs thereof that are joined by a common curvilinear section and are placed side by side along their respective backs; and
- a third series of flat layers 4b' of uncured composite material defining the part of the flanges 8' intended to come into contact with the skin 2.

Subsequently, one or more inserts 25', commonly known as "noodles", are inserted into the gap created between layers 4b' and layers 4a' in the area in which the common curvilinear features are placed; said curvilinear features act as fillers and are made of uncured composite material.

Even in this solution, the free end side edges 13 of the flanges 8 are cut in a slanted direction with respect to the lying surface S in such a way as to present an extension, along or parallel to the lying surface S itself, in the subsequent step of bringing the skin 2 and the stringers 3' into contact with each other, increasing towards the skin 2.

The assembly formed by the skin 2 and the stringers 3' is placed on a curing tool 12', in this case for example of the OML type, having a housing for the skin 2.

Advantageously, the side edges 13 of the flanges 8 are covered and sealed outwardly by respective patch elements made of thin-walled uncured composite material.

Figure 14A:
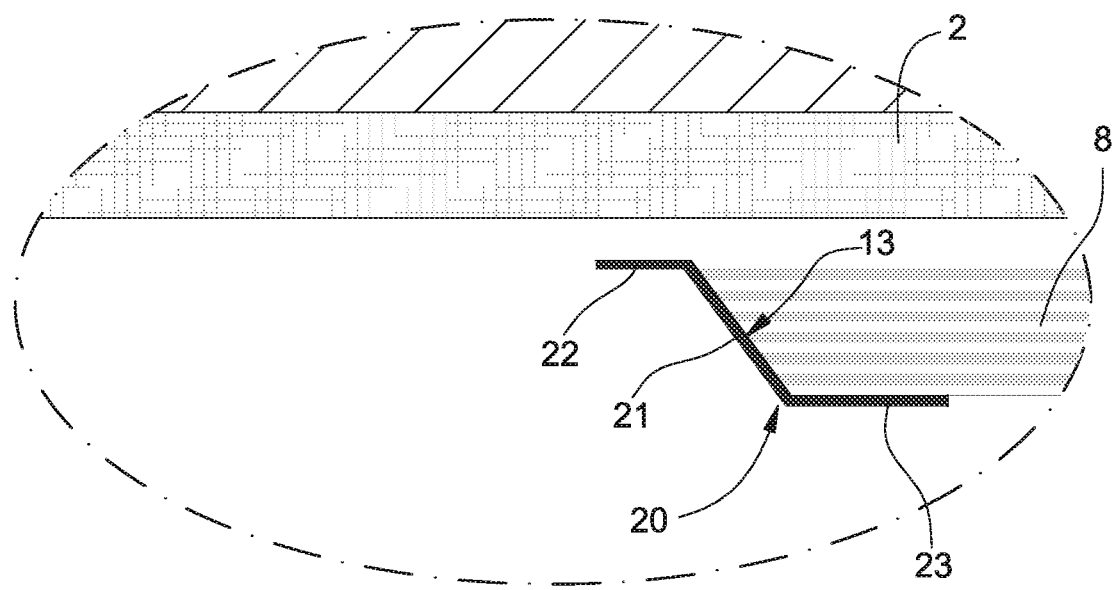
FIG. 14A depicts FIGS. 10 to 13 enlarged in scale.

As can be seen, in particular, in FIGS. 10 and 14A, while applying the patch elements 20 on the cut side edges 13, the first portions 21 of said patch elements 20 cover the cut side edges 13, the second portions 22 protruding from one side of the said side edges 13 are folded over the skin 2 while the skin 2 and the stringers 3' are being brought into contact with each other, and the third portions 23 protruding from an opposite side of the said cut side edges 13 are folded over the respective flanges 8 on the side of the raised portion 7'.

In practice, the patch elements 20 are substantially folded in "Z"-shape around the side edges 13 of the flanges 8, so as to cover the layers 4a' and 4b' by sealing them outwards.

Figure 14B:
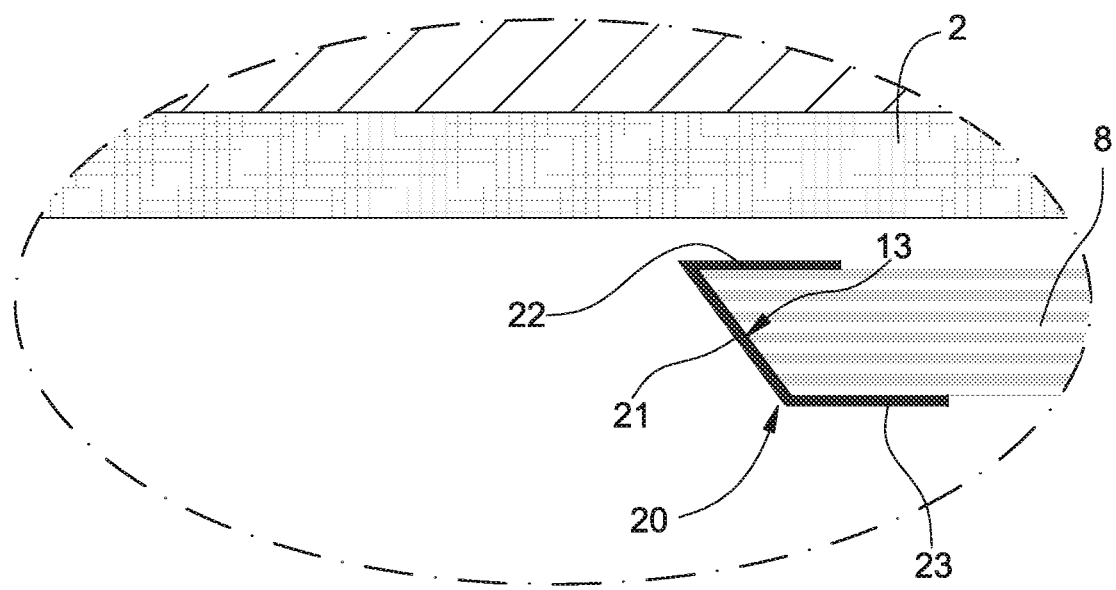
FIG. 14B depicts a possible variant of the detail shown in FIG. 14A.

Alternatively, according to the solution shown in FIG. 14b, the second portions 22 may be folded, during the folding of the patch elements 20, onto their respective flanges 8 in a position facing the third portions 23, so as to interpose themselves between the skin 2 and the stringers 3' while they are being brought into contact with each other.

In practice, the patch elements 20 are substantially folded in a C-shape around the side edges 13 of the flanges 8, so as to cover the layers 4a' and 4b' by sealing them outwards.

The free end side edge of the raised portion 7' is also covered and sealed outwards by a C-patch element 30.

The co-curing operation is carried out in this case by sealing a vacuum bag 31 on the curing tool 12' that externally covers each stringer 3'.

According to a possible alternative embodiment that has not been shown and by way of analogy to what has been seen in the procedure described with regard to FIGS. 1 to 6, the outermost composite layers 4a' of the two Ls forming the stringer 3' could respectively have lateral end flaps protruding with respect to the cut side edges 13 of the flanges 8 that are folded in a C- or Z-shape on the side edges 13 themselves, so as to cover and seal them outwards. In this manner, the said protruding flaps would replace the patch elements 20.

As denoted above, the stringers 3' (or skin 2) could be pre-cured, joined to the skin 2 (or stringers 3') by a layer of structural adhesive and then be subjected together with the skin 2 (or stringers 3') to an autoclave co-bonding operation.

According to a further possible embodiment, both the stringers 3' and the skin 2 could be pre-cured individually, joined together by using a structural adhesive and then subjected to an autoclave or cold bonding operation.

Figure 11:
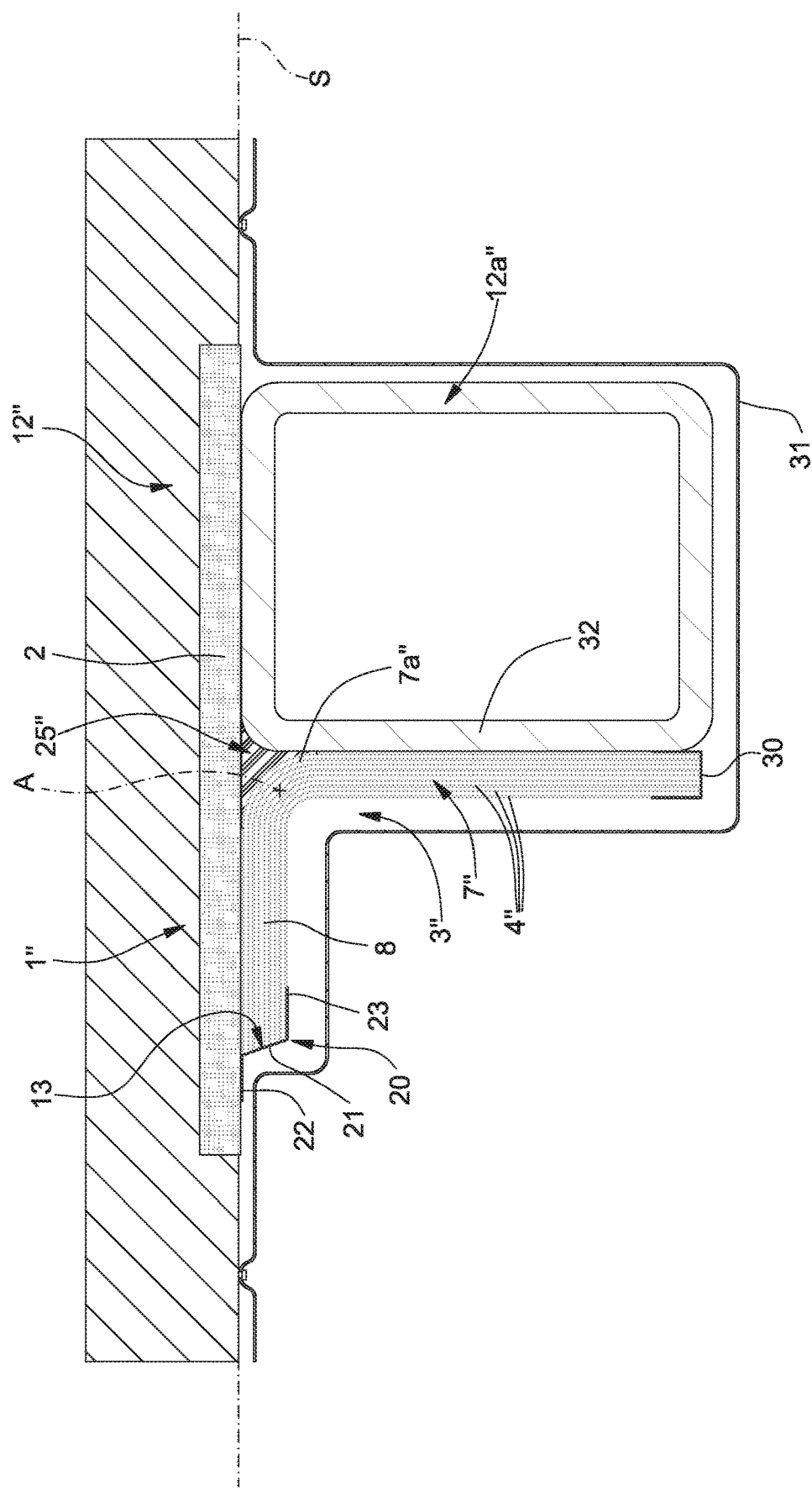

With regard to FIG. 11, the structural component 1" comprises a skin 2 identical to the one described above and a stringer 3" having a different geometry from that of the stringers 3 and 3'.

In particular, the stringer 3" has a longitudinal axis A and a cross-sectional area transversal to said longitudinal axis A that is substantially L-shaped. The stringer 3" includes a single lateral flange 8 that is identical to the corresponding flange 8 of the stringers 3 and 3', and a raised portion 7" having a thin flat sheet extending substantially in a direction that is orthogonal to the flange 8 and to the lying surface S of said flange.

More precisely, the raised portion 7" has one end connected to one end of the flange 8 by a curvilinear section 7a".

The stringer 3" is obtained by laminating on a special moulding tool (that is known in itself and that has not been shown) a series of layers 4" of uncured L-shaped composite material having the same course as the flange 8 and the raised portion 7".

Even in this solution, the side edge 13 of the free end of the flange 8 is cut in a slanted direction with respect to the lying surface S in such a way as to present, in the subsequent step of bringing the skin 2 and the stringers 3" into contact with each other, an extension, along or parallel to the lying surface S itself, increasing towards the skin 2.

The assembly formed by skin 2 and stringers 3" is placed on a 12" curing tool, for example of the OML type in this case, having a housing for the skin 2.

In this case, the curing tool 12" also includes an auxiliary tool 12a" having a cavity quadrangular shape with curved or rounded edges, which is arranged on the opposite side of the skin 2 with respect to the curing tool 12" and receives the raised portion 7" of the stringer 3" in support on its own boundary wall 32.

One or more inserts 25", commonly known as "noodles", are inserted in the gap created between the skin 2, the auxiliary tool 12a" and the stringer 3" at the curvilinear section 7a". These inserts 25" act as fillers and are made of uncured composite material.

Advantageously, the side edge 13 of the flange 8 is covered and sealed outwards by a patch element 20 (FIGS. 11, 14A and 14B) made of thin-walled uncured composite material, which is entirely identical to the one used to cover the side edges 13 of the flanges 8 of the stringers 3, 3' and is folded in the exact same two modes that have been shown above (FIGS. 14A and 14B).

Even in this case, the free end side edge of the raised portion 7" is covered and sealed outwardly by a C-patch 30.

The co-curing operation is performed in this case by sealing on the curing tool 12" and the auxiliary tool 12a" a vacuum bag 31 that externally covers each stringer 3".

According to a possible alternative embodiment that has not been shown and by way of analogy to what has been seen in the process described in connection with FIGS. 1 to 6, the outermost composite material layer 4" forming the stringer 3" could have a lateral end flap protruding with respect to the relative cut side edge 13 of the flange 8 and folded in a C- or Z-shape on the side edge 13 itself so as to cover it and seal it outwards. In this manner, said protruding flap would replace the patch element 20.

As denoted above, the stringers 3" (or skin 2) could be pre-cured, joined to skin 2 (or stringers 3") by a layer of structural adhesive and then subjected together with skin 2 (or stringers 3") to an autoclave co-bonding operation.

According to a further embodiment, both the stringers 3" and the skin 2 could be individually pre-cured, joined together by a structural adhesive and then subjected to an autoclave or cold bonding operation.

Figure 12:
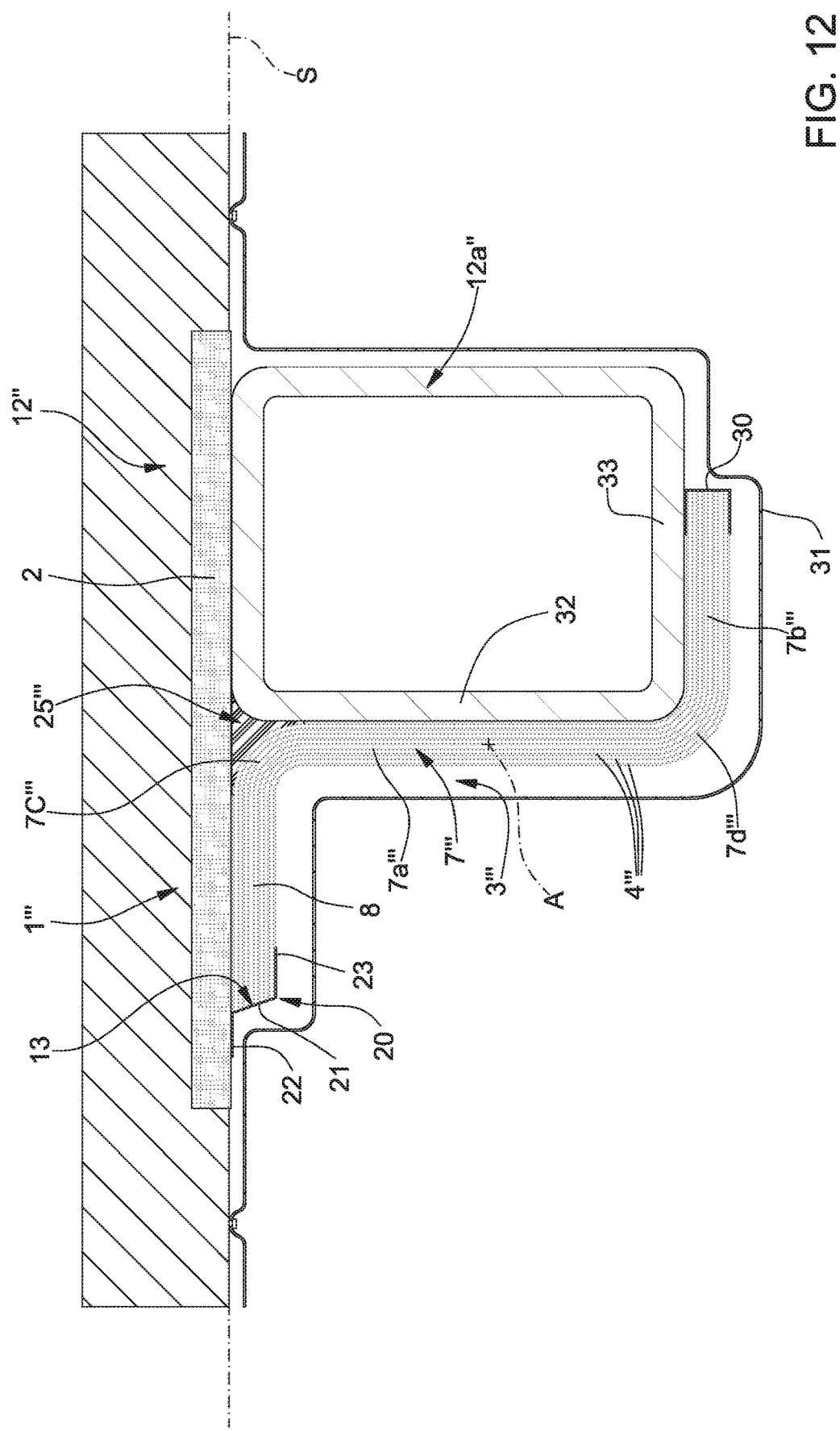

With regard to FIG. 12, the structural component 1''' comprises a skin 2 identical to the one described above and a stringer 3''' having a geometry that is different from that of the stringers 3, 3' and 3".

More precisely, the stringer 3''' has a longitudinal axis A and a section that is transversal to said longitudinal axis A that is substantially Z-shaped. The stringer 3''' comprises a single lateral flange 8 intended to be joined to the skin 2 that is identical to the flange 8 of the stringer 3", and a thin-sheet raised portion 7''', extending cantilevered from the flange 8 and including a first section 7a''' that is substantially orthogonal to the flange 8 and to the lying surface S of said flange, as well as a second flange section 7b''' parallel to the flange 8 extending from the section 7a''' in the opposite direction to said flange 8.

In particular, the section 7a''' has a first end connected to an end of the flange 8 by means of a curvilinear section 7c''' and a second opposite end connected to the section 7b''' by means of another curvilinear section 7d'''.

The stringer 3''' is made by laminating on a special moulding tool (that is per se well-known and not shown) a series of layers 4''' made of uncured Z-shaped composite material, having the same course as the flange 8 and the raised portion 7'''.

Even in this solution, the side edge 13 of the free end of the flange 8 is cut in a slanted direction with respect to the lying surface S in such a way as to present, in the subsequent phase of bringing the skin 2 and the stringers 3''' into contact with each other, an extension, along or parallel to the lying surface S itself, increasing towards the skin 2.

The assembly formed by the skin 2 and stringers 3''' is placed on the same curing tool 12" and auxiliary tool 12a" used for component 1".

In this case, the boundary wall 32 of the auxiliary tool 12a" is supported by section 7a''' of the raised portion 7''' of the stringer 3''' and another boundary wall 33 that is contiguous and orthogonal to said boundary wall 32 is supported by section 7b'''. The curvilinear section 7d''' of the raised portion 7''' of the stringer 3''' is instead placed on the curvilinear edge joining the boundary walls 32 and 33.

One or more inserts 25''', commonly known as "noodles", that act as fillers and that are made of uncured composite material, are inserted in the gap created between the skin 2, the auxiliary tool 12a''' and the stringer 3''' at the curvilinear section 7c''' of the raised portion 7'''.

Advantageously, the side edge 13 of the flange 8 is covered and sealed outwardly by a patch element 20 (FIGS. 12, 14A and 14B) made of thin-walled uncured composite material, which is identical to the one used to cover the side edges 13 of the flanges 8 of the stringers 3, 3', 3" and is folded in the exact same two ways that have been seen above (FIGS. 14A and 14B).

Even in this case, the free end side edge of the raised section 7b''' of the raised portion 7''' is covered and sealed outwards by a C-patch element 30.

As has been seen in connection with the structural component 1", the co-curing operation is performed by sealing on the curing tool 12" and the auxiliary tool 7a" a vacuum bag 31 that outwardly covers each stringer 3'''.

According to a possible alternative embodiment that has not been shown and by way of analogy to what has been seen in the process described with regard to FIGS. 1 to 6, the outermost composite material layer 4''' forming the stringer 3''' could have a lateral end flap protruding with respect to the relative cut side edge 13 of the flange 8 that is folded in a C- or Z-shape on said side edge 13 so as to cover it and seal it outwards. In this manner, said protruding flap would replace the patch element 20.

As denoted above, the stringers 3''' (or skin 2) could be pre-cured, joined to the skin 2 (or stringers 3''') by a layer of structural adhesive and then subjected together with the skin 2 (or stringers 3''') to an autoclave co-bonding operation.

According to a further possible embodiment, both the stringers 3''' and the skin 2 could be pre-cured individually, joined together using a structural adhesive and then subjected to an autoclave or cold bonding operation.

Figure 13:
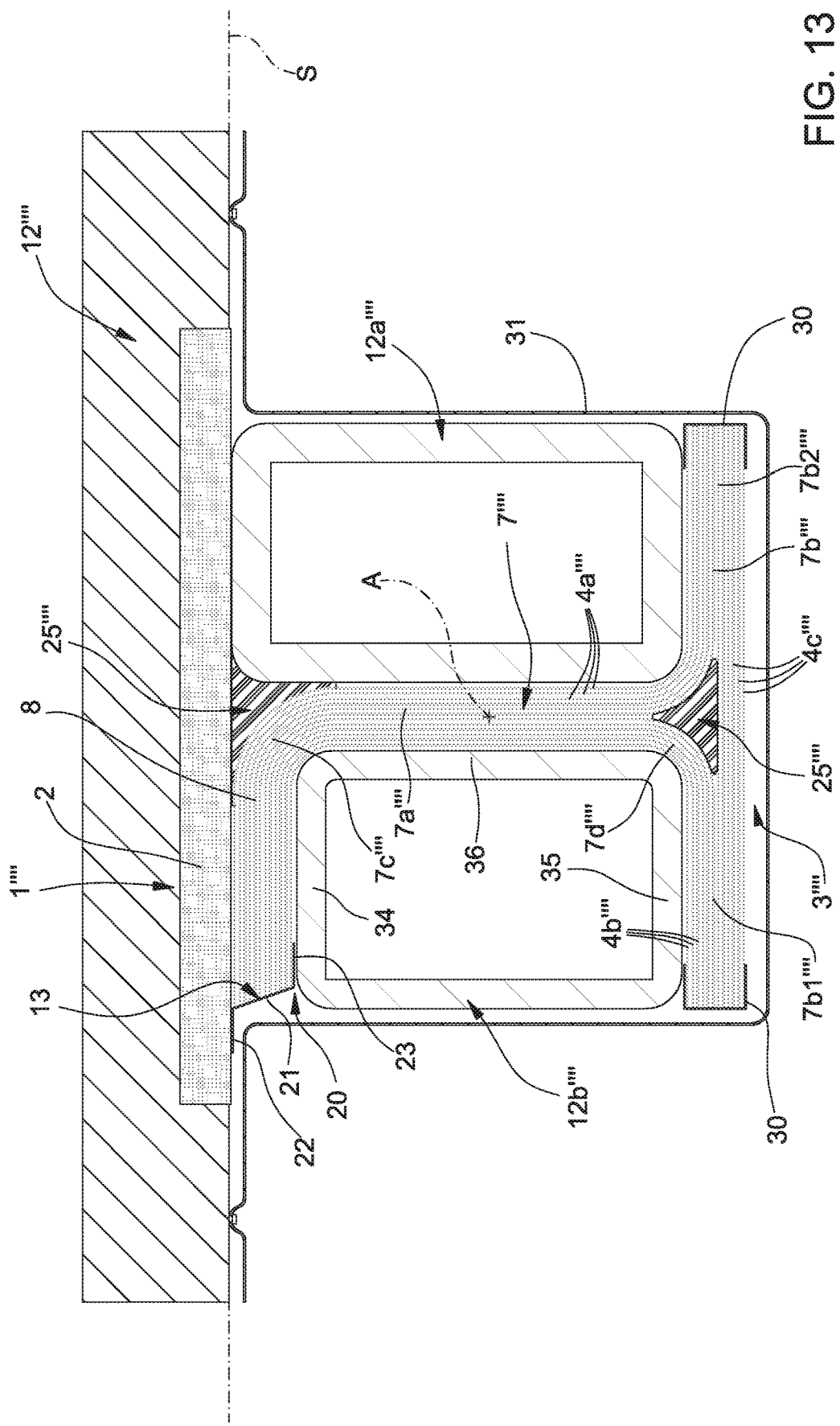

With regard to FIG. 13, the structural component 1'''' comprises a skin 2 identical to the one described above and a stringer 3'''' having a different geometry from that of the stringers 3, 3', 3" and 3'''.

More precisely, the stringer 3'''' has a longitudinal axis A and a section transverse to said longitudinal axis A substantially shaped like a J. The stringer 3'''' comprises a single lateral flange 8 that is intended to be joined to the skin 2 and is identical to the flange 8 of the stringers 3" and 3'''', and a raised thin-laminated portion 7'''' extending cantilevered from the flange 8, which comprises a first section 7a'''' that is substantially orthogonal to the flange 8 and to the lying surface S of said flange, and a second flanged section 7b'''' that is parallel to the flange 8 and that extends from the section 7a'''' symmetrically on both sides thereof.

In particular, the section 7a'''' has a first end connected to one end of the flange 8 by a curvilinear section 7c'''' and a second opposite end connected to section 7b'''' by a section 7d'''' having a section that increases and is delimited on the opposite sides by respective concave curvilinear surfaces.

More precisely, section 7b'''' is divided by sections 7a'''' and 7d'''' into two segments 7b1'''' and 7b2'''' extending from the opposite sides of said sections 7a'''' and 7d''''; segment 7b1'''' is arranged facing flange 8, whereas segment 7b2'''' extends on the side of section 7a'''' that is opposite to segment 7b1'''.

The stringer 3'''' is obtained by laminating on a special forming tool (that is well-known and has not been disclosed):

a first series of layers 4a'''' made of untreated Z-shaped composite material in use that are arranged closer to the skin 2 and that have the same course as the flange 8, sections 7a'''', 7c'''' and segment 7b2'''' of the raised portion 7''';

a second series of layers 4b"" of C-shaped uncured composite material having the same course as the flange 8, sections 7a"", 7c"" and segment 7b1"" of the raised portion 7'''; and a series of flat layers 4c"" of untreated composite material having the same course as the entire section 7b"", superimposed on the corresponding portions of layers 4a"" and 4b"" forming segments 7b1"" and 7b2"".

Subsequently, one or more inserts 25"", commonly known as "noodles", which act as fillers and are made of uncured composite material, are inserted into the gap between layers 4c"" and layers 4a"" and 4b"" in the connecting area between sections 7a"", 7b"" and 7d"".

Even in this solution, the free end side edge 13 of the flange 8 is cut in a slanted direction with respect to the lying surface S in such a way as to present, in the subsequent step of bringing the skin 2 and the stringers 3"" into contact with each other, an extension, along or parallel to the lying surface S itself, increasing towards the skin 2.

The assembly formed by the skin 2 and the stringers 3"" is arranged on a curing tool 12"" having substantially the same shape as the curing tool 12" and comprising a first auxiliary tool 12a"" that is similar to the auxiliary tool 12a", and a second auxiliary tool 12b"", also having a cavity quadrangular shape with curved or rounded edges that is arranged when being used on the side of the section 7a"" of the stringer 3"" that is opposite to the auxiliary tool 12a"". In this manner, the section 7a"" of the stringer 3"" remains interposed between the two auxiliary tools 12a"" and 12b""; furthermore, the auxiliary tool 12b"" cooperates with the flange 8 through its own boundary wall 34, with the segment 7b1"" through its own boundary wall 35 that is opposite and parallel to the boundary wall 34, and with the section 7a"" through its own boundary wall 36 that is orthogonal to and interposed between the boundary walls 34 and 35.

One or more inserts 25"", commonly known as "noodles", which act as fillers and are made of uncured composite material, are inserted in the gap created between the skin 2, the auxiliary tool 12a"" and the stringer 3"" at the curvilinear section 7c"" of the raised portion 7"".

Advantageously, the side edge 13 of the flange 8 is covered and sealed outwardly by a patch element 20 (FIGS. 13, 14A and 14B) made of thin-walled uncured composite material, which is entirely identical to the one used to cover the side edges 13 of the flanges 8 of the stringers 3, 3', 3", 3''' and is folded in the exact same two modes that have been seen above (FIGS. 14A and 14B).

Even in this case, the opposite free end side edges of the raised portion 7b"" are covered and sealed outwards by their respective C-shaped patch elements 30.

As has been seen in connection with structural components 1", 1''', the co-curing operation is performed by sealing on the curing tool 12"" and on the auxiliary tools 7a"" and 7b"" a vacuum bag 31 that externally covers each stringer 3"".

According to a possible embodiment that has not been shown and by way of analogy to what has been seen in the process disclosed with regard to FIGS. 1 to 6, layer 4b"" made of composite material forming the layer of the flange 8 opposite to the one intended to cooperate with the skin 2 could have a lateral end flap protruding with respect to the relative cut side edge 13 of the said flange 8 that is folded in a C- or Z-shape on said side edge 13 so as to cover it and seal it outwards. In this manner, said protruding flap would replace the patch element 20.

As denoted above, the stringers 3"" (or skin 2) could be pre-cured, joined to the skin 2 (or stringers 3"") by a layer of structural adhesive and then subjected together with the skin 2 (or stringers 3"") to an autoclave co-bonding operation.

According to a further possible embodiment, both the 3"" stringers and the skin 2 could be pre-cured individually, joined together by a structural adhesive and then subjected to an autoclave or cold bonding operation.

An examination of the characteristics of the manufacturing process for structural components 1, 1', 1", 1''', 1"" described above reveals the advantages that can be achieved by it.

In particular, this manufacturing process allows a structural component 1, 1', 1", 1''', 1"" free of accentuated surface discontinuities to be obtained, especially in the junction between the stringers 3, 3', 3", 3''', 3"" and the skin 2. Indeed, a smoother connection is determined between the flanges 8 of each stringer 3, 3', 3", 3"" and the said skin 2, also improving the distribution of stresses in the junction between the stringers 3, 3', 3", 3"" and the skin 2.

In particular, this results in an optimal transfer of operating loads from the 3, 3', 3", 3''', 3"" stringers to the skin 2 and vice versa.

Furthermore, in the case of the stringers 3, these have a greater ease of handling and insertion/extraction in the curing tool 12, in particular in the shaped cavity 15 of the said curing tool 12. Accordingly, said shaped cavity 15 may have a simple shape free of sharp chamfers and surface discontinuities.

Finally, on account of the presence of a further layer 16 or the patch elements 20, the uncovered fibres of the side edges 13 of the flanges 8 or the end edges of other parts of the stringers 3, 3', 3", 3''', 3"" are protected, decreasing or eliminating the risk of infiltration of moisture or other fluids that are being used, as well as the risk of structural delamination. In other words, the additional layer 16 or the patch elements 20, in addition to being integral or constituent parts of the final structural component 1, 1', 1", 1''', 1"", define a coating that protects the side edges 13 of the flanges 8 or the end edges of the stringers 3, 3', 3", 3''', 3"" from moisture.

It is clear that modifications and variants can be made to the process manufacturing the structural components 1, 1', 1", 1''', 1"" described and shown herein without departing from the scope of protection defined by the claims.

In particular, the step of forming each stringer 3, 3', 3", 3''', 3"" could be carried out when the stringer itself is placed on the curing tool 12, 12', 12", 12"".

Furthermore, the step of cutting the side edges 13 could also be carried out directly when the stringer 3, 3', 3", 3''', 3"" is placed on the curing tool 12, 12', 12", 12"".

In this manner, the entire process could be carried out by using a single tool for forming and curing the component.

The invention claimed is:

1. Process for manufacturing a structural component in composite material comprising a skin and at least one stiffening stringer applied rigidly and integrally to a face of said skin; said process comprising the following steps:
   a) arranging on a tool a plurality of first layers of uncured or pre-cured composite material forming said at least one stiffening stringer, wherein said at least one stiffening stringer presents a longitudinal axis and has a raised portion protruding from at least one flange extending parallel to said longitudinal axis and along a lying surface, which is flat or is a surface of revolution;
   b) arranging on said tool a plurality of second layers of uncured or pre-cured composite material forming said skin;

c) making said face of said skin, parallel to said lying surface, and said flange of said at least one stiffening stringer adhere to each other thus forming an assembly;

d) applying predetermined temperature and pressure on the assembly so as to compact said first layers and said second layers together, to rigidly join said skin to said at least one stiffening stringer, wherein the predetermined temperature and pressure cures any uncured material in said first and second layers;

e) prior to step c), performing a cutting operation in a slanted direction with respect to the lying surface on a free end side edge of the first layers forming said flange thus forming a cut side edge that extends further as it approaches the skin;

f) laminating at least a further layer of composite material on the side of said at least one stiffening stringer opposite said skin; said further layer defining the outermost layer of said at least one stiffening stringer and having a lateral end flap protruding beyond the cut side edge of the other layers forming said flange; and g) covering said cut side edge of said flange by folding said lateral end flap of said further layer on the cut side edge so as to form a coating of composite material on the cut side edge defining, at the end of said process, a constituent or integral part of said structural component, the further layer configured to cover the stiffening stringer in the stiffening stringer's entirety, wherein during the folding of the lateral end flap of said further layer a first portion of said lateral end flap covers the respective cut side edge of said flange and a second portion, still protruding from the cut side edge itself, is folded over said flange so as to interpose itself, in said step c), between said skin and said at least one stiffening stringer.

2. Process according to claim 1, wherein said at least one stiffening stringer has, in a section transversal with respect to said longitudinal axis, a T- or L- or Z- or J-shaped profile.

3. Process according to claim 1, wherein said raised portion of said at least one stiffening stringer is concave and is placed centrally between two said lateral flanges extending along said lying surface; and wherein, in said step c), said skin and said concave raised portion of said at least one stiffening stringer form a closed-profile cavity.

4. Process according to claim 3, comprising, after step a) and before step c), the step of h) positioning at least one longitudinal expandable insert inside the concave raised portion of said at least one stiffening stringer, so that the expandable insert is entirely housed within the cavity defined during step c); and the process further comprising, after step c) and during step d), the step of i) expanding said expandable insert against the walls delimiting the cavity to maintain said cavity.

5. Process according to claim 4, wherein the step i) is performed by applying pressure inside said expandable insert.

6. Process according to claim 4, wherein the step i) is carried out by applying heat to said expandable insert.

7. Process according to claim 4, wherein the step i) is performed by applying inside said expandable insert the same pressure applied outside the assembly during step d).

* * * * *